Sept. 13, 1960  W. F. BILLINGSLEY  2,952,293
TIRE BEAD GROMMET
Filed July 31, 1957
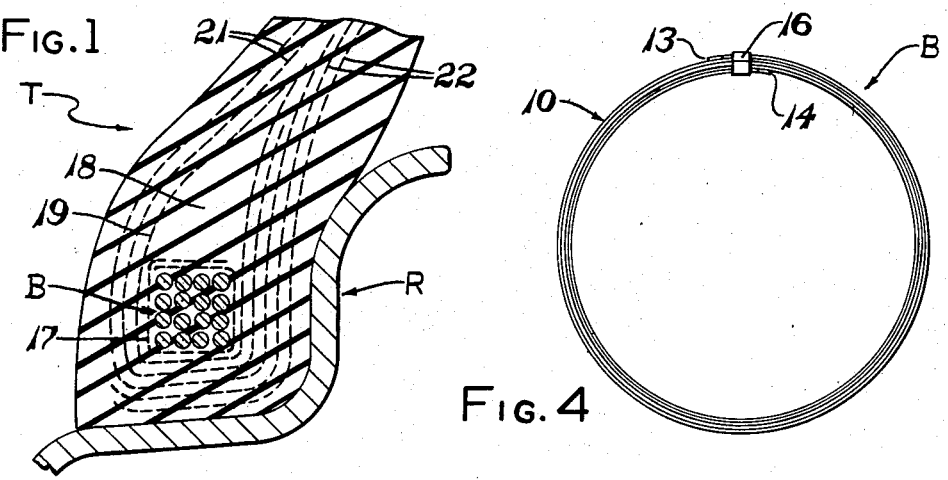
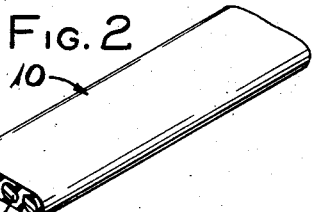
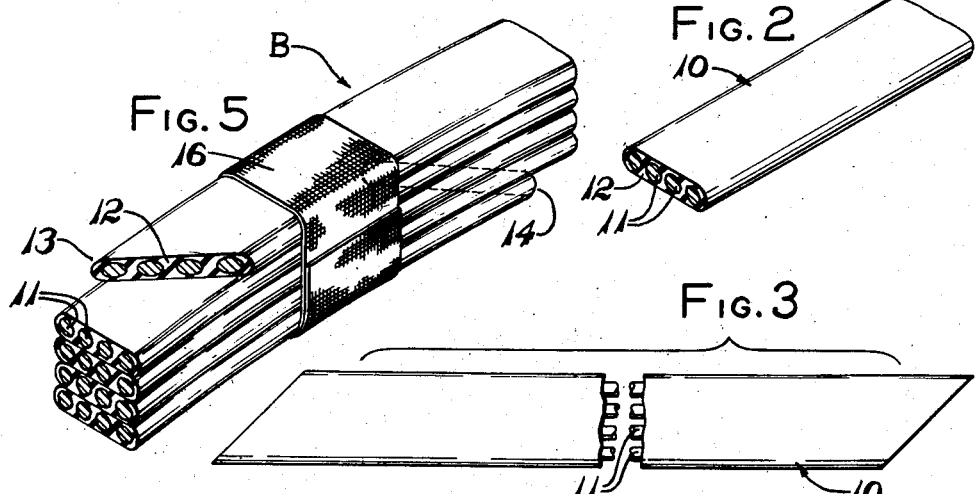
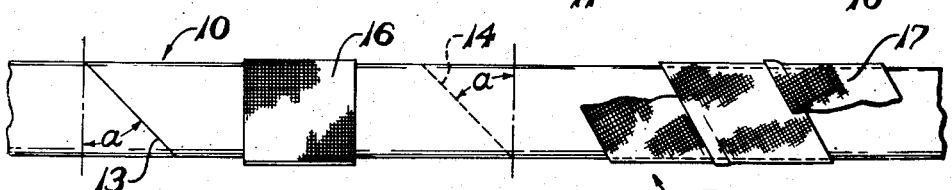
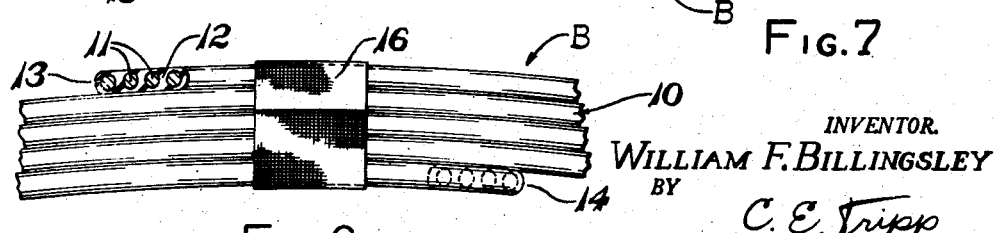
INVENTOR.
WILLIAM F. BILLINGSLEY
BY
C. E. Tripp
ATTY.

United States Patent Office 2,952,293
Patented Sept. 13, 1960

2,952,293

TIRE BEAD GROMMET

William F. Billingsley, Silver Lake, Ohio, assignor to The B. F. Goodrich Company, New York, N.Y., a corporation of New York Filed July 31, 1957, Ser. No. 675,470

1 Claim. (Cl. 152—362)

This invention relates to pneumatic tires of the straight sidewall type having inextensible beads for retaining the tires on the rim seats. The beads of pneumatic tires of this type are rendered virtually inextensible by incorporation therein of bead grommets. These grommets are made of rubber covered tensile elements usually formed of a high quality carbon steel wire although they may be formed of steel tape covered with rubber. When wires are used, for example, a band of several wires is passed through an extruder which surrounds them with carbon black reinforced rubber compound forming a flat tape. The bead grommets are formed by coiling or wrapping the tape upon itself, and after the desired number of convolutions is attained, the tape is severed with the inner and outer ends overlapping. The severed ends usually are retained in place for further operations by the applications of a narrow band of friction tape or by staples. The grommet is usually wrapped with rubberized fabric. A filler or apex strip of rubber compound is usually applied to the radially outer side of the grommet. A flipper strip of rubberized fabric is wrapped around the assembly forming the completed bead ready for the tire building operation.

Although modern passenger car tires are designed so that the beads make a tight fit on the rim base, a considerable amount of flexing motion of the sidewalls during running occurs, which motion must be resisted by the bead grommets, so that there is a constant working of the grommets and severe forces are cyclically applied to and resisted by the grommets. These forces are magnified as the size of the tire is increased and are very severe in truck tires. Also, in some truck tires, the beads do not tightly embrace the rim seats thereby aggravating the working of the beads and placing an even more severe strain on the bead grommets. As a result of this severe service, the bead grommets occasionally break thereby ruining the tire.

It has been found that the break in the grommet generally occurs at the radially inner end of the tape. Heretofore, the tapes have been cut at a 90° angle to their edges and it is believed that this causes a highly localized zone of flexing thereby tending to cause the metal of the grommet to fatigue at that zone and weakening ti so that it is subject to breakage. Localized fatigue and attendant grommet breakage is greatly reduced in the grommet of my invention by cutting the tape at an acute angle of 30° to 60° with the edges of the tape, thus there is no abrupt transition in resistance to bending, and the bending effect produced by the end of the tape is distributed over a circumferential zone rather than being at an axial line. The same bias cutting operation results in the outer end of the tape likewise being disposed at an acute angle to the edges of the grommet and leaves the outer end parallel with the inner end of the tape. Thus, the stress distribution action is also present at the outer end of the tape.

It is good practice to overlap the ends of the tape somewhat and with prior grommets this overlap has often amounted to a length of 5 to 6 inches on an average size tire, in order to spread apart the two localized zones of stress and to give adequate union of the parts after cure. With the grommet of this invention, the overlap can be reduced to the minimum distance required for a good joint without danger of bringing together localized stress areas. This results in a saving of tape material which can be significant when it is considered that millions of grommets are manufactured each year, and that the wire and rubber materials employed for the grommets are of the highest quality and are, therefore, costly.

The manner in which my invention may be practiced by those skilled in the art will be apparent from the following detailed description of a preferred embodiment thereof.

In the drawings:

Fig. 1 is a section through a tire bead assembled on a rim;

Fig. 2 is a perspective section of the tape forming the grommet;

Fig. 3 is a plan view of a length of tape uncoiled;

Fig. 4 is a side view of the tape coiled into a grommet;

Fig. 5 is a perspective view of a section of the grommet;

Fig. 6 is a side view thereof; and

Fig. 7 is a plan view of the grommet with part of a wrapping in place.

Referring to Fig. 1, the pneumatic tire T is seated on the rim R in the usual manner. The tire has an inextensible bead indicated generally at B, the construction of which appears in the other figures. The grommet is formed of a flat tape 10 which, in the construction shown, comprises 4 parallel wire members 11 surrounded by a rubber body 12. Wire members 11 are formed of a good quality carbon steel their diameter being about .037 to .043 inch, in a common range of tire sizes. These wires are usually plated with zinc, copper or a brass to increase their adhesion to the rubber body 12. The method and apparatus for covering the wires with rubber and for coiling them into the grommet is known in the art and forms no part of the invention.

As seen in the drawings, the outer end 13 and the inner end 14 are cut to form an acute angle with the edge of the tape. The bias cut angle (a), as indicated in Fig. 7, may be within the range of 30 to 60 degrees but is preferably between 45 and 60 degrees. In order to temporarily hold the ends of the tape in place before the next operation, a small strip of friction tape 16 is wrapped around the coil, or other fastening means such as staples may be used. The coiled tape may be spirally wrapped with rubber coated tape as at 17, Fig. 7, or may be longitudinally wrapped with a length of rubberized fabric in accordance with the usual practice.

Returning to Fig. 1, a rubber filler or apex strip 18 is usually applied to the radially outer side of the grommet and a flipper strip 19 is wrapped around the assembly to strengthen the bead zone and to facilitate seating the beads on the tire carcass during the building operation. The inner carcass plies 21 are turned up and outer plies 22 are turned down and wrapped around the bead assembly in the usual manner and the tread and sidewall rubber are applied. A liner may be applied if the tire is a tubeless tire in accordance with conventional practice.

This method of cutting the ends of the bead tape eliminates the localized bending action that otherwise occurs at those ends and distributes the transitional bending zone over a circumferential distance, reducing fatigue and danger of breakage. Also, the circumferential overlap of the ends can be reduced to the minimum required for sure holding without bringing two highly localized zones of flexure and fatigue close together.

Having completed a detailed description of a preferred embodiment of the invention, I claim:

A pneumatic tire comprising a generally toroidal carcass terminating in circumferentially extending axially spaced bead portions, each of said bead portions including an annular grommet formed of a plurality of superposed spirally disposed convolutions of a single tape formed of parallel wires united by rubber, the ends of said tape being in radially spaced circumferentially overlapping relationship and extending in parallel relationship from side to side of the grommet at an acute angle in the range of 30° to 60° measured relative to the sides of the grommet.

References Cited in the file of this patent

UNITED STATES PATENTS

| 24,243 | Smith | May 31, 1859 |
| 1,375,046 | Hardy | Apr. 19, 1921 |
| 1,914,040 | Pierce | June 13, 1933 |